United States Patent [19]

Rolff et al.

[11] 4,339,703
[45] Jul. 13, 1982

[54] TWO STEP PHASE RESET GYRO MOTOR POWER SUPPLY

[75] Inventors: William J. Rolff, Woodcliff Lake; Samuel Costa, Ringwood; William A. Hendricks, Parsippany, all of N.J.

[73] Assignee: The Singer Company, Little Falls, N.J.

[21] Appl. No.: 183,686

[22] Filed: Sep. 3, 1980

[51] Int. Cl.³ .............................................. H02P 5/40
[52] U.S. Cl. ................................... 318/702; 318/701; 318/318
[58] Field of Search ................ 318/701, 702, 314, 318; 74/5.7

[56] References Cited

U.S. PATENT DOCUMENTS

| | | | |
|---|---|---|---|
| 3,500,160 | 3/1970 | Sommer | 318/318 |
| 3,546,553 | 12/1970 | Loyd | 318/318 |
| 3,829,747 | 8/1974 | Woolfson et al. | 318/702 |
| 4,266,432 | 5/1981 | Schroeder et al. | 318/318 |

Primary Examiner—David Smith, Jr.
Attorney, Agent, or Firm—Morris Liss; Thomas W. Kennedy

[57] ABSTRACT

A gyro motor supply provides an alternating signal to a gyro hysterisis motor. A detector senses the passage of a reference point on the gyro flywheel during each revolution thereof. A logic circuit is driven by the detector output and controls the phase of the alternating signal thereby ensuring a repeatable gyro start-up condition wherein the phasing is fixed between the reference point on the flywheel and a vector of the rotating field of the motor.

5 Claims, 3 Drawing Figures

TWO STEP PHASE RESET GYRO MOTOR POWER SUPPLY

BACKGROUND OF THE INVENTION

The present invention relates to a gyro motor power supply.

BRIEF DESCRIPTION OF THE PRIOR ART

In order to optimize the run-to-run drift repeatability of a flexure type gyro utilizing a hysteresis motor, it is necessary to phase the gyro flywheel relative to the vector of the rotating field of the motor. This is accomplished by controlling the gyro motor supply after synchronous speed of the motor is attained.

A first approach for attaining this end is directed to manually repeatedly interrupting the motor power until the flywheel has "slipped" to the desired phasing determined by a position sensor.

A second approach for accomplishing the intended purpose is the resetting of the phasing of the supply determined by a flywheel position sensor.

The disadvantages of both approaches are severe limitations of accuracy due to the uncertainty of the motor lag angle (typically 15 to 30 electrical degrees). The first mentioned approach introduces additional errors due to the practical limitation of power interrupt resolution and the variation of "slipping" characteristics from unit to unit.

BRIEF DESCRIPTION OF THE PRESENT INVENTION

The present invention utilizes an automatic system for achieving the desired phasing between a reference point on a gyro flywheel and the vector of the rotating field of the gyro motor. By accomplishing a preselected fixed phasing relationship during start-up of a gyro, the drift performance of the gyro between start-up conditions becomes repeatable thereby permitting more accurate data collection from an operating gyro.

The present invention utilizes a conventional gyro motor supply which is capable of varying the phase of its output alternating signal in two steps, in response to corresponding pulse inputs to a countdown logic section of the supply. A two step variation of the phasing permits extremely close phase tolerance to be achieved. The inventive system relies upon a pulse input generated by a flywheel reference point position detector which generates a pulse during each rotation of the flywheel.

The primary contribution of the present invention is the utilization of a flywheel position detector for generating a signal pulse which is gated to a first input of a gyro motor supply to achieve "coarse tuning" of the desired flywheel phasing. A first pulse input to the gyro motor supply is delayed by a predetermined interval and serves as a second input to the gyro motor supply to "fine tune" the phasing.

Flywheel position detectors, of the type used herein, are used for various purposes in a gyro, such as disclosed in copending U.S. application Ser. No. 187,010, entitled "Resonator Restrained Gyro", by William C. Albert, and assigned to the assignee of the present application. As previously mentioned, the gyro motor supply of the type used herein has previously been used to vary the phase of the motor input to a gyro. However, the combination of a flywheel position detector and such a gyro motor supply, in synergistic combination with a two step logic control circuit for accomplishing the discussed phasing is not known in the prior art.

By virtue of the present invention, a simple and highly accurate gyro motor supply becomes available for a flexure type gyro with a hysterisis motor which is capable of controlling the phasing between the flywheel and the vector of the rotating field of the gyro motor to very close tolerances which optimizes the run-to-run drift repeatability of the gyro.

The above-mentioned objects and advantages of the present invention will be more clearly understood when considered in conjunction with the accompanying drawings, in which:

DETAILED DESCRIPTION OF THE INVENTION

Figure 1:
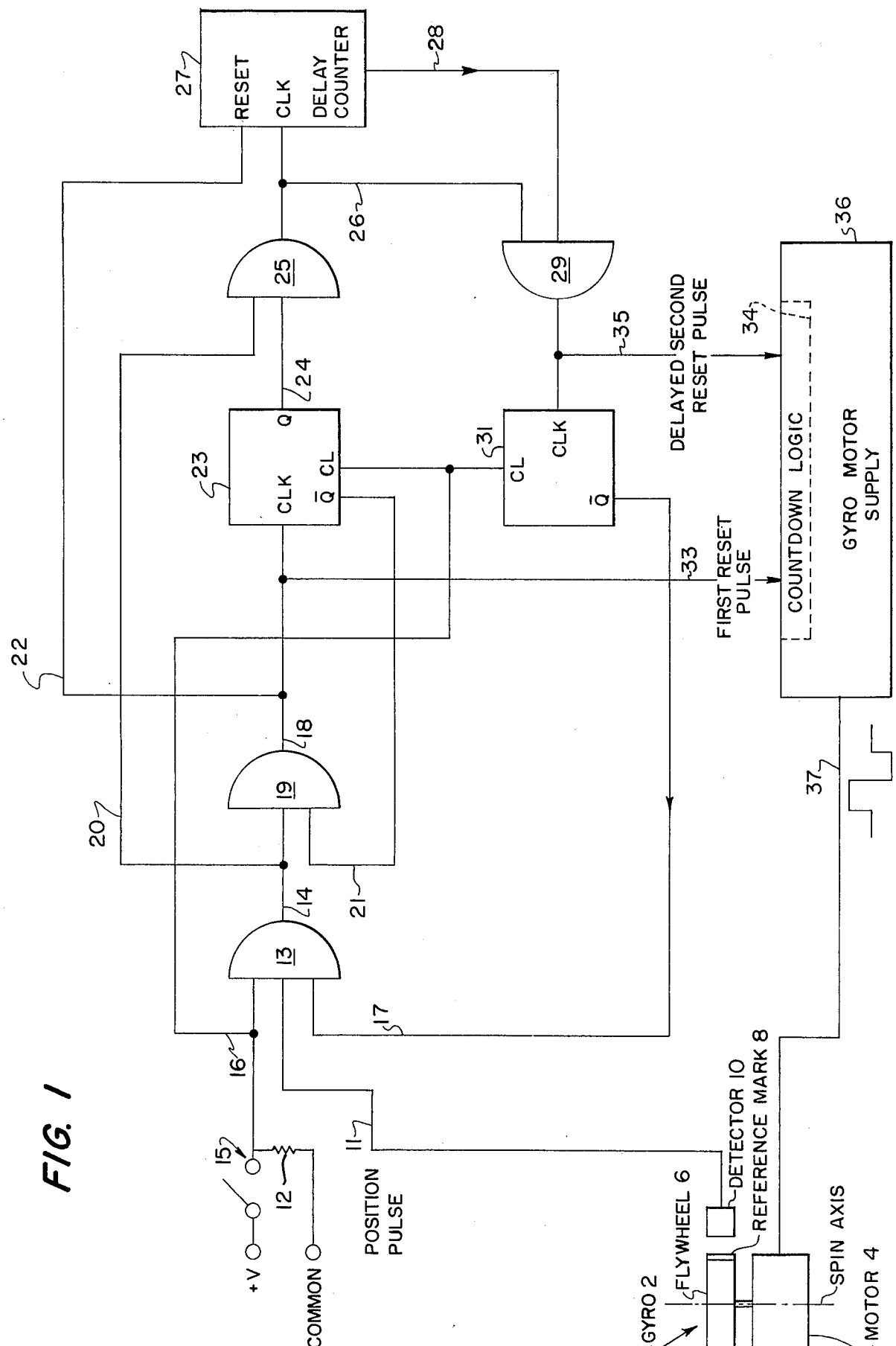
FIG. 1 is an electrical schematic diagram illustrating the inventive logic circuit employed between a conventional gyro and a conventional gyro motor supply.

Referring to the figures and more particularly FIG. 1 thereof, a conventional gyro 2 is schematically illustrated. This gyro may be of the flexure type with a hysteresis motor 4 connected to a flywheel 6. In order to sense the position of the flywheel, a reference mark 8 may be located on the flywheel while a conventional detector 10, which may be of the optical type, senses the passage of the reference mark 8 once per revolution of the flywheel. Conventional magnetic or capacitive flywheel position detectors may be employed with equal success. Each time the detector 10 is energized, a position pulse becomes present upon lead 11 which serves as a first input to AND gate 13. The upper illustrated input of gate 13 is normally connected to a common circuit potential through resistor 12. A logic "1" is provided to the upper illustrated input of gate 13 when the switch 15 is closed. As a result, gate 13 is enabled when a pulse from the detector 10 occurs along lead 11. The enabled gate 13 allows this position pulse to appear at its output terminal 14 so long as a cutoff pulse does not occur along lead 17. The latter is connected to the lower illustrated input of gate 13. The output from gate 13 enables AND gate 19 as long as a cutoff pulse does not occur along lead 21, the latter providing a second input to gate 19. During start-up of gyro 2, when the motor 4 approaches synchronous speed, the cutoff pulses do not occur along leads 17 and 21 so that the position pulse from detector 10 may appear at the output 18 of gate 19.

The position pulse is transmitted along lead 33 to the countdown logic section 34 of a conventional gyro motor supply 36. The countdown logic section 34 is discussed in greater detail hereinafter. The first pulse occurring along lead 33 serves to reset the countdown logic to cause two phase alternating signals with predetermined phase to occur along supply output 37. The mentioned power supply may be of the type manufactured by N H Research, Inc. of Santa Ana, Calif., identified as Model SF 2273. The two phase output 37 of supply 36 is connected to motor 4 so that "coarse tuning" of the phasing of flywheel 6, relative to the vector of the rotating field of motor 4 is achieved upon the introduction of the pulse along lead 33 to the countdown logic section 34.

The position pulse at the output of gate 19 is connected to the CLK terminal of a flip-flop 23 which sets the Q output terminal 24 to a logic "1" thereby serving as a first input to AND gate 25. A second input to this gate is furnished along lead 20, connected to the output terminal 14 of previously mentioned gate 19. Thus, in response to coincidence between the position pulse occurring along lead 20 and the logic "1" level occurring at the Q output terminal 24, the gate 25 is enabled to generate a second pulse to the CLK input terminal of delay counter 27. This latter-mentioned counter is typically a down counter with a preset count which generates a delayed pulse output along lead 28 after the preset count. The output from counter 27 provides a first input to AND gate 29 while the second input thereof is via lead 26, connected to the output of AND gate 25. Gate 29 becomes enabled during enablement of gate 25 and the occurrence of the delayed count pulse from counter 27. The delayed count pulse is transferred, along lead 35, to a second input of countdown logic section 34. The purpose of the delayed count pulse from the enabled gate 29 is to serve as a second reset pulse to the countdown logic section 34 wherein predetermined "fine tuning" may occur for the output of the gyro motor supply 36.

In order to assure that counter 27 is initially reset, the position pulse at the output of gate 19 is transferred, along lead 22, to the RESET terminal of counter 27. The latching of flip-flop 23 by the enabled output of AND gate 19 sets the $\overline{Q}$ terminal to a logic zero level thereby inhibiting AND gate 19 from enabling further position pulses to pass through the circuit. In order to inhibit AND gate 13, the delayed second reset pulse from gate 29 is introduced to the CLK terminal of latching flip-flop 31 thereby setting the $\overline{Q}$ terminal of this flip-flop to a logic zero level, transferred along lead 17 to inhibit gate 13. Thus, while switch 15 remains closed, only a first reset pulse along lead 33 and a delayed second reset pulse along lead 35 are introduced to the countdown logic section 34 at two separate points in time. As soon as each of these pulses are introduced to the countdown logic section 34, further triggering of the circuitry is inhibited until the switch 15 is opened and subsequently closed. Each time switch 15 is closed, clearing pulses are transferred along lead 16 to the CL terminals of flip-flops 23 and 31.

Figure 2:
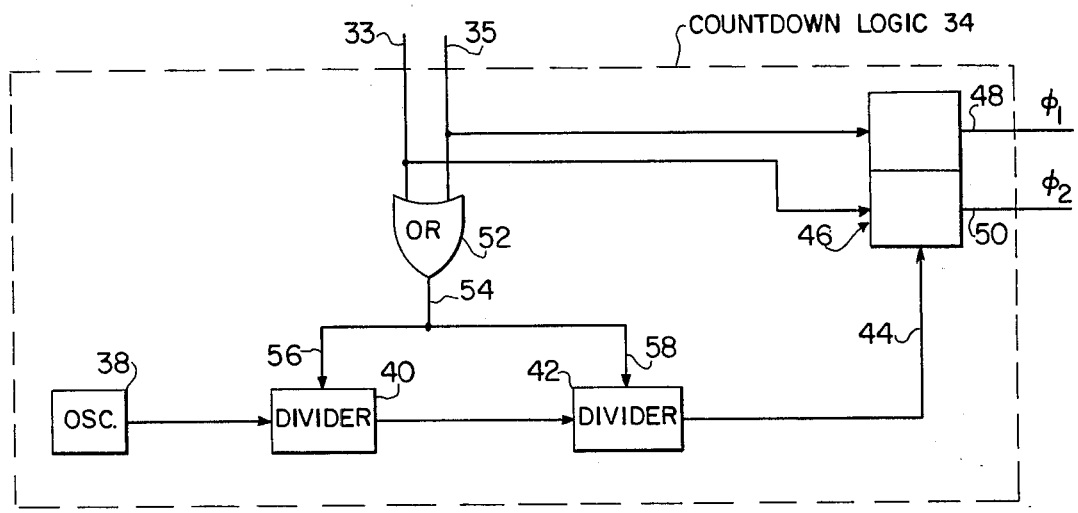
FIG. 2 is a block diagram of the countdown logic section of the gyro motor supply shown in FIG. 1.

FIG. 2 illustrates a schematic diagram for the countdown logic section 34 previously mentioned in connection with FIG. 1. The countdown logic section includes a crystal oscillator 38, the output of which is frequency divided by serially connected dividers 40 and 42. The output from the second divider 42 drives, along lead 44 a countdown counter generally indicated by reference numeral 46. Such a counter may include a conventional quasi flip-flop configuration with a predetermined preset count. The output leads 48 and 50 from the countdown counter 46 carry the two phase signals $\phi_1$ and $\phi_2$, which upon power amplification by the remainder of the gyro motor supply 36 drives gyro motor 4. The first reset pulse along lead 33 and the delayed second reset pulse along lead 35 generate an output signal at the output terminal 54 of OR gate 52 which provides reset inputs along leads 56 and 58 of respective dividers 40 and 42. The signals along leads 33 and 35 also reset countdown counter 46.

Figure 3:
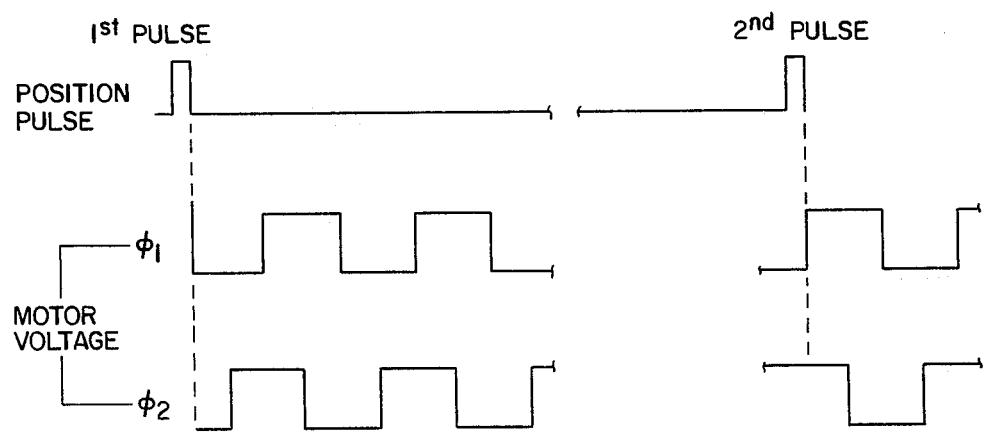
FIG. 3 is a composite timing diagram of various signals in the logic circuitry of FIG. 1.

Referring to FIG. 3, a composite timing diagram, in the circuitry of FIG. 1, is shown. The upper plot shows two successive position pulses occurring along lead 11 (FIG. 1). The remaining plots show the 90 degrees phase relationship between the two phase motor voltage output signals $\phi_1$ and $\phi_2$. These latter-mentioned two phase signals are generated by the gyro motor supply 36 and are transferred to the power input of gyro motor 4 for energization thereof.

In operation of the system, the alternating output signal from gyro motor supply 36 is applied as excitation to the hysterisis gyro motor 4 which attains synchronous speed.

When switch 15 is initially closed, the first reset pulse occurs along lead 33 and resets the countdown logic so that an instantaneous heading is established between the flywheel signal pulse and the resultant motor field vector. The application of this first reset pulse along lead 33 may not be sufficient to avoid uncertainty in the phasing, particularly where the electrical angle change, after application of the first reset pulse, is less than the motor lag angle (typically 15–30 electrical degrees).

Thus, "fine tuning" is necessary by causing the delayed second reset pulse, along lead 35, to reset the countdown logic section 34, thereby shifting the resultant motor field vector by an additional 180 electrical degrees from the first reset. This will overcome the lag angle and thereby eliminate the mentioned uncertainty.

Thus, the circuitry of the invention accomplishes the resetting of the supply countdown logic section 34 to a first instantaneous heading established by detector 10 and thereafter, after the delay encountered through counter 27, to an additional 180 electrical degrees which overcomes the lag angle uncertainty of the gyro motor.

By repeatedly fixing the phasing of the gyro flywheel 6, relative to the vector of the rotating field of motor 4, the run-to-run drift repeatability of the hysterisis gyro motor 4 is optimized.

It should be understood that the invention is not limited to the exact details of construction shown and described herein for obvious modifications will occur to persons skilled in the art.

We claim:

1. A phase control system for a gyro synchronous motor comprising:
    means for detecting cyclical rotation of a reference point on a gyro flywheel and generating a position pulse in response to each rotational cycle;
    power supply means for a gyro synchronous motor;
    means for connecting the output of the power supply means to a synchronous gyro motor; and
    logic circuit means connected at its input to the detecting means at its output to an input of the supply means for providing a first reset pulse to the supply means which establishes a predetermined phase between the flywheel reference point and a vector of the synchronous motor rotating field;
    wherein signal delaying means are included in the logic circuit means for generating a second reset pulse delayed with respect to the first reset pulse for causing an additional phase shift of a preselected amount to occur thereby ensuring that the total phase shift exceeds a lag angle of the motor which might otherwise create uncertainty of data collected from a gyro.

2. A system for resetting gyro motor phase comprising:

a gyro which includes a flywheel rotated by a synchronous motor;

means for detecting periodic rotation of a reference point on the flywheel and generating a position pulse in respect to each rotational cycle;

power supply means for the gyro motor;

means connecting the output of the power supply means to the gyro motor; and logic circuit means connected at its input to the detecting means at its output to an input of the supply means for providing a first reset pulse to the motor supply which establishes a predetermined phase between the flywheel reference point and a vector of the motor rotating field;

wherein signal delaying means are included in the logic circuit means for generating a second reset pulse delayed with respect to the first reset pulse for causing an additional phase shift of a preselected amount to occur thereby ensuring that the total phase shift exceeds a lag angle of the motor which might otherwise create uncertainty of data collected from a gyro.

3. A system for controlling gyro motor phase comprising:

a gyro including a flywheel rotated by a synchronous motor;

means for detecting periodic rotation of a reference point on the flywheel and generating a position pulse in respect to each rotational cycle;

power supply means for the gyro motor;

means connecting the output of the power supply means to the gyro motor;

gating means connected at its input to the output of the detecting means;

means connecting the output of the gating means to an input of the power supply means for providing a first reset pulse to the supply means which establishes a predetermined phase between the flywheel reference point and a vector of the motor rotating field;

together with delaying means responsive to the first reset pulse for generating a second reset pulse delayed with respect to the first reset pulse; and means for connecting the delaying means to an input of the supply means for causing an additional phase shift of a preselected amount to occur thereby ensuring that the total phase shift exceeds a lag angle of the motor which might otherwise create uncertainty of data collected from a gyro.

4. The system set forth in claim 3 together with means responsive to the second reset pulse for inhibiting the inputting of pulses to the supply means, subsequent to the first and second reset pulses.

5. The system of claim 4 wherein the delaying means includes a delay counter having an input thereof responsive to the first reset pulse, the second reset pulse being generated at the output of the counter after a preset count elapses.

* * * * *